US012436540B2

(12) United States Patent
Shoeb et al.

(10) Patent No.: US 12,436,540 B2
(45) Date of Patent: Oct. 7, 2025

(54) USING UAV FLIGHT PATTERNS TO ENHANCE MACHINE VISION DETECTION OF OBSTACLES

(71) Applicant: WING Aviation LLC, Mountain View, CA (US)

(72) Inventors: Ali Shoeb, San Rafael, CA (US); Marcus Hammond, Redwood City, CA (US)

(73) Assignee: Wing Aviation LLC, Palo Alto, CA (US)

( * ) Notice: Subject to any disclaimer, the term of this patent is extended or adjusted under 35 U.S.C. 154(b) by 244 days.

(21) Appl. No.: 18/132,288

(22) Filed: Apr. 7, 2023

(65) Prior Publication Data

US 2024/0338026 A1 Oct. 10, 2024

(51) Int. Cl.
*G05D 1/00* (2024.01)
*B64C 39/02* (2023.01)
(Continued)

(52) U.S. Cl.
CPC ........... *G05D 1/106* (2019.05); *B64C 39/024* (2013.01); *G05D 1/0607* (2013.01); *G06T 7/20* (2013.01); *G06T 7/70* (2017.01); *B64U 2101/30* (2023.01); *B64U 2101/64* (2023.01); *B64U 2201/10* (2023.01); *G06T 2207/10032* (2013.01); *G06T 2207/20081* (2013.01); *G06T 2207/20084* (2013.01)

(58) Field of Classification Search
CPC .... G05D 1/106; G05D 1/0607; B64C 39/024; G06T 7/20; G06T 7/70; G06T 2207/10032; G06T 2207/20081; G06T 2207/20084; B64U 2101/30; B64U 2101/64; B64U 2201/10
See application file for complete search history.

(56) References Cited

U.S. PATENT DOCUMENTS 9,623,905 B2 * 4/2017 Shashua ............. G01C 21/3602
10,269,138 B2 4/2019 Li et al.
(Continued)

FOREIGN PATENT DOCUMENTS

DE 202022105719 U1 3/2023

OTHER PUBLICATIONS

International Search Report and Written Opinion mailed Feb. 9, 2024, in corresponding International Application No. PCT/US2023/079475, 15 pages.
(Continued)

*Primary Examiner* — Hunter B Lonsberry
*Assistant Examiner* — Harrison Heflin
(74) *Attorney, Agent, or Firm* — Christensen O'Connor Johnson Kindness PLLC (57) ABSTRACT

A technique for detection of an obstacle by a UAV includes arriving above a location at a first altitude by the UAV; navigating a descent flight pattern from the first altitude towards the location; acquiring aerial images of the location below the UAV with a camera system disposed onboard the UAV; and analyzing the aerial images with a machine vision system disposed onboard the UAV that is adapted to detect a presence of the obstacle in the aerial images. The descent flight pattern is selected to increase perception by the machine vision system of the obstacle.

21 Claims, 10 Drawing Sheets

(51) Int. Cl.
  *B64U 101/30* (2023.01)
  *B64U 101/64* (2023.01)
  *G06T 7/20* (2017.01)
  *G06T 7/70* (2017.01)

(56) References Cited

U.S. PATENT DOCUMENTS

| | | | |
|---|---|---|---|
| 10,571,932 | B2 | 2/2020 | DeBitetto et al. |
| 10,642,271 | B1 | 5/2020 | Graber et al. |
| 11,835,561 | B2 * | 12/2023 | Blanc-Paques .......... G08G 5/80 |
| 2016/0229533 | A1 * | 8/2016 | Van Cruyningen ..... B64C 13/18 |
| 2017/0084038 | A1 * | 3/2017 | Dane ...................... G06V 20/56 |
| 2018/0004207 | A1 * | 1/2018 | Michini ................... G08G 5/55 |
| 2019/0031342 | A1 * | 1/2019 | Mitchell ................ B64U 30/29 |
| 2019/0266901 | A1 * | 8/2019 | McHale ................ G05D 1/0676 |
| 2020/0104598 | A1 * | 4/2020 | Qian ....................... G06V 20/20 |
| 2020/0195862 | A1 * | 6/2020 | Briggs ................. H04N 13/239 |
| 2022/0055749 | A1 * | 2/2022 | Stein ........................ G08G 5/26 |
| 2022/0100211 | A1 * | 3/2022 | Miyata .................. B64C 39/024 |
| 2023/0312091 | A1 | 10/2023 | Shoeb et al. |
| 2024/0231391 | A1 * | 7/2024 | Bedrich ................. G06V 20/17 |

OTHER PUBLICATIONS

Templeton et al., "Autonomous Vision-based Landing and Terrain Mapping Using an MPC-controlled Unmanned Rotorcraft", XP008157832, 2007 IEEE International Conference on Robotics and Automation, Roma, Italy, Apr. 10-14, 2007, pp. 1349-1356.

Deris et al., Depth Cameras on UAVs: A First Approach, The International Archives of the Photogrammetry, Remote Sensing and Spatial Information Sciences, vol. XLII-2/W3, 2017 3D Virtual Reconstruction and Visualization of Complex Architectures, 7 pages, Mar. 2017.

Gageik et al., An Autonomous UAV with an Optical Flow Sensor for Position and Navigation, International Journal of Advanced Robotic Systems, 2013, vol. 10, 9 pages.

Zhang et al., Automatic Power Line Inspection Using UAV Images, Remote Sensing www.mdpi.com/journal/remotesensing, Aug. 10, 2017, 20 pages.

Schofield et al., Autonomous powerline detection and tracking system using UAVs, Microprocessors and Microsystems 94, 2022, https://doi.org/10.1016/j.micpro.2022.104609, Aug. 8, 2022, 14 pages.

Elements of Computer Vision, https://cs.stanford.edu/people/eroberts/soco/products/1997-98/computer-vision/motion.html, Sep. 29, 2022, 2 pages.

Gerig, Optical Flow II, CS 6320, Spring 2015, 54 pages.

Zhang et al., Detecting Power Lines in UAV Images with Convolutional Features and Structured Constraints, Remote Sensing, www.mdpi.com/journal/remotesensing, Jun. 4, 2019, 18 pages.

Event Camera, Wikipedia, https://en.wikipedia.org/wiki/Event_camera, downloaded from Internet on Mar. 9, 2023, 5 pages.

Dietsche, et al., Powerline Tracking with Event Cameras, https://github.com/uzhrpg/line_tracking_with_event_cameras, downloaded from Internet on Mar. 9, 2023, 10 pages.

Collins, Lecture 22: Camera Motion, Readings: T&V Sec 8.1 and 8.2, https://www.cse.psu.edu/~rtc12/CSE486/lecture22.pdf, downloaded from Internet on Oct. 4, 2022, 9 pages.

Carrio et al., Onboard Detection and Localization of Drones Using Depth Maps, IEEE Access, vol. 8, Feb. 5, 2020, 11 pages.

Tchernykh et al., Optical Flow Navigation for an Outdoor UAV Using a Wide Angle Mono Camera and Dem Matching, 2002, IFAC.

O'Donovan et al., Optical Flow: Techniques and Applications, Apr. 6, 2005, 26 pages.

Optical Flow, Wikipedia, https://en.wikipedia.org/w/index.php?title=Optical_flow&oldid=1107945655, Sep. 1, 2022, 6 pages.

Dietsche, et al., Powerline Tracking with Event Cameras, IEEE/RSJ International Conference on Intelligent Robots and Systems, 2021, 8 pages.

* cited by examiner

USING UAV FLIGHT PATTERNS TO ENHANCE MACHINE VISION DETECTION OF OBSTACLES

TECHNICAL FIELD

This disclosure relates generally to obstacle avoidance by aircraft, and in particular but not exclusively, relates to detection of ground-based obstacles by unmanned aerial vehicles using machine vision techniques.

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly environments of first impression or populated urban/suburban environments), the UAV should be capable of effectively identifying and avoiding ground-based obstacles.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for enhancing the detection/perception of ground-based obstacles by a machine vision system using aerial maneuvers as part of a descent flight pattern are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein increase the detection/perception of obstacles by a machine vision system of an aerial vehicle when descending towards a ground area, such as a delivery location by an unmanned aerial vehicle (UAV) providing an aerial package delivery service. The obstacles may be ground-based objects, such as powerlines, telecommunication wires, trees, buildings, etc. The techniques include aerial maneuvers as part of a descent flight pattern that are selected to accentuate, enhance, or otherwise increase the perception of these obstacles by the machine vision system used by the UAV for visual navigation and/or real-time obstacle avoidance.

Certain ground-based obstacles can be more difficult to detect or disambiguate from an aerial perspective (e.g., plan view) than others. Powerlines and telecommunication wires (collectively referred to as "utility lines") are examples of difficult to detect and accurately track their actual offset distance. This difficulty can stem from the extreme proportions of their aerial perspective shape (very narrow and very long) while also having little or no distinguishing features along their long axis dimension. Utility lines often extend in opposing directions that exceed the aperture of the onboard camera system of UAVs. Within the camera aperture there are few distinguishing features from which an accurate depth estimate can be detected and the image shapes or patterns that are presented to the camera can be misleading (sometimes referred to as the "aperture problem"). The difficulty of disambiguating and accurately estimating the depth of objects in aerial images is not limited to utility lines, but is applicable to other potential ground-based hazards or obstacles (e.g., fences, rooflines, narrow hedges, signs, etc.). These obstacles often present aerial perspective shapes having extreme aspect ratios (very short axis and a very long axis).

Embodiments disclosed herein describe descent flight patterns navigable by a UAV that include aerial maneuvers which increase the perception of these obstacles by the onboard machine vision system. These aerial maneuvers may include a spiral descent or vacillation along a linear axis. The spiral descent may include a rectangular spiral descent having linear flight path segments. In some embodiments, the vacillations or linear flight path segments are orientated substantially perpendicular to a long axis of the obstacle. These descent flight patterns can aid obstacle detection and tracking by machine vision systems. Such machine vision systems may include depth perception by stereovision cameras, an event camera that detects objects via brightness variations, lidar depth cameras, or otherwise, but is particularly well-suited for use with an optical flow image analysis.

In some embodiments, activation of these descent flight patterns may be automatic when the UAV descends to a location (e.g., package delivery location). In other embodiments, these descent flight patterns may be triggered by a semantic analysis of a variety of input data (e.g., map data, 3D model data, global positioning system (GPS) data, image segmentation of the aerial images, etc.).

Figure 1:
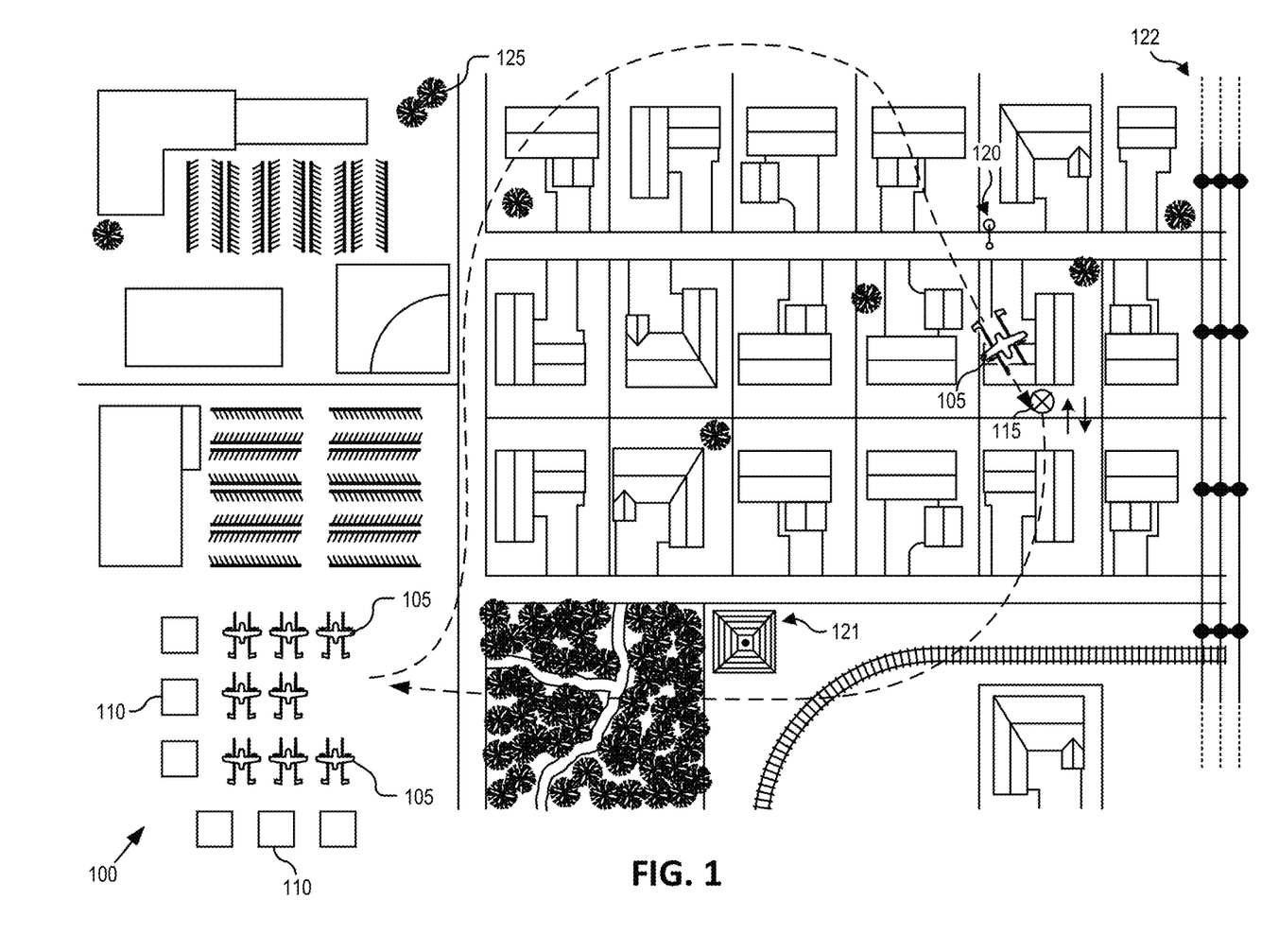
FIG. 1 illustrates operation of unmanned aerial vehicles (UAVs) in the presence of ground-based obstacles to provide an aerial delivery service to a neighborhood, in accordance with an embodiment of the disclosure.

FIG. 1 is a plan view illustration of a terminal area 100 for staging UAVs 105 that deliver packages to a neighborhood, in accordance with an embodiment of the disclosure. UAVs may one day routinely deliver small items into urban or suburban neighborhoods from small regional or neighborhood hubs such as terminal area 100 (also referred to as a local nest). Vendor facilities 110 may be set up adjacent to terminal area 100 to take advantage of the aerial delivery service. A typical aerial delivery mission may include loading a UAV 105 with a package from a vendor facility 110 at terminal area 100, where it ascends to a cruise altitude enroute to a customer destination 115. At destination 115, UAV 105 descends for package drop-off before once again ascending to a cruise altitude for the return journey back to terminal area 100.

During the course of a delivery mission, ground-based obstacles may be an ever-present hazard-particularly tall slender obstacles such as street lights 120, radio towers 121, utility lines 122, cranes, fences, trees 125, rooflines, etc. Some of these obstacles may be persistent unchanging obstacles (e.g., streetlights, telephone poles, radio towers, etc.) while others may be temporary (cranes, etc.), or always changing (e.g., trees). Regardless, identification and avoidance of these obstacles is important for safe UAV navigation. These ground-based obstacles may be tall enough to present a hazard during cruise flight segments enroute to-and-fro destination 115 or present an acute hazard when descending to, or ascending from, destination 115. Accordingly, embodiments described herein disclose descent flight patterns that are selected to increase the perception of these obstacles by onboard machine vision systems. Accurate detection and tracking of these obstacles enables recording of these encounters for subsequent analysis, reporting these encounters for the immediate safety of other UAV missions, and taking real-time remedial actions for the safety of the UAV that first identifies a given obstacle.

Figure 2:
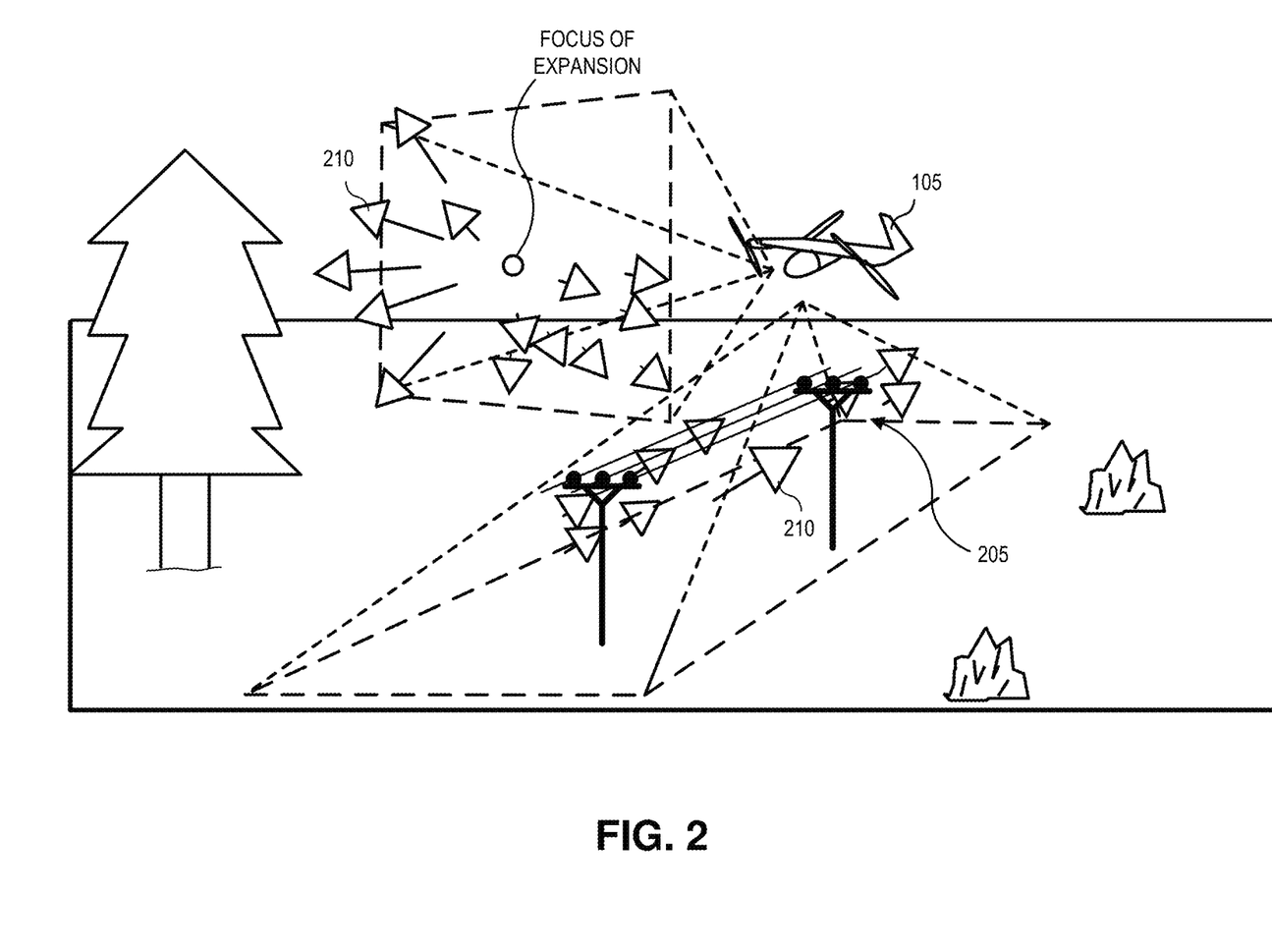
FIG. 2 illustrates optical flow-based analysis to identify ground-based obstacles, in accordance with an embodiment of the disclosure.

FIG. 2 illustrates optical flow-based analysis to identify encounters between UAV 105 and obstacle 205 (e.g., utility lines 122), in accordance with an embodiment of the disclosure. Optical flow is the pattern of motion of image pixels representing objects, surfaces, edges, etc. in a visual scene due to relative motion between the observer (e.g., onboard camera system) and a scene (e.g., ground area below UAV 105). Optical flow is the distribution of apparent velocities, or flow velocities 210, of the image pixels between consecutive image frames in a video stream (e.g., sequence of aerial image frames). Objects in the image, or image pixels, that appear to move more quickly are estimated to be closer or have a shallower image depth than image pixels that move more slowly. The divergence of these flow velocities can be used to compute a "focus of expansion," which indicates a direction of heading for UAV 105, a gradient in flow velocities across an object can be used to estimate its height, and the absolute flow velocity of an image pixel can be used to estimate its image depth in the scene (i.e., distance between object and camera). Accordingly, an onboard camera system of UAV 105 that is oriented to look down at the ground below the UAV can be leveraged to estimate distances to objects captured in the images to thereby flag close encounters with ground-based obstacles. In embodiments where the onboard camera system is a stereovision camera system, the optical flow analysis of the machine vision system can be supplemented with conventional depth perception that leverages parallax to estimate object distances. Other machine vision systems may also be leveraged including lidar, event cameras, or monovision frame cameras. Finally, the machine vision system may also include semantic analysis that leverages object detection and additional knowledge graphs (e.g., map data) based upon GPS location to further detect, identify, and track obstacles.

Figure 3A:
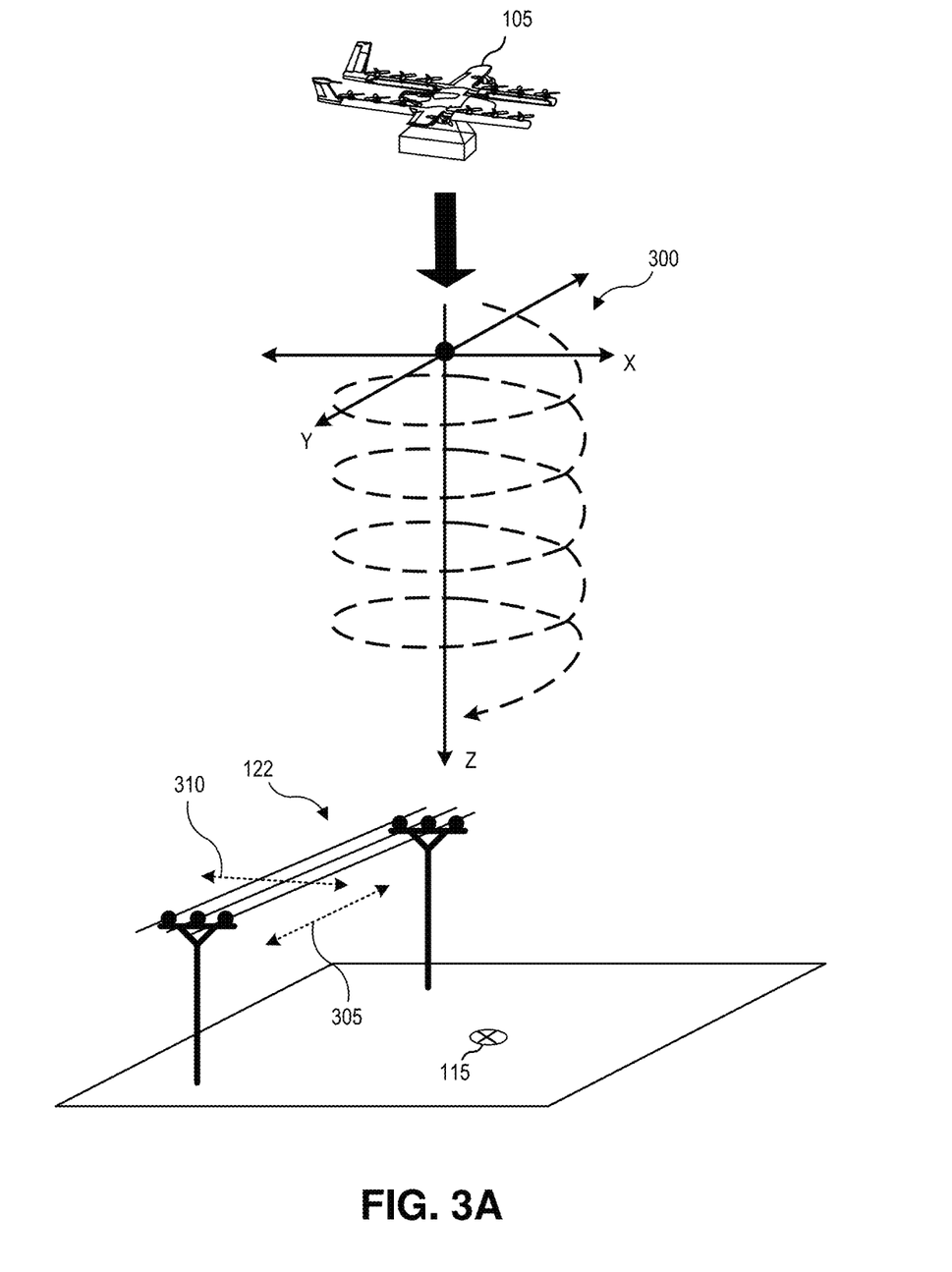
FIG. 3A illustrates how aerial maneuvers, such as a spiral descent executed as part of a descent flight pattern, can increase perception of a ground-based obstacle by a machine vision system, in accordance with an embodiment of the disclosure.

FIG. 3A illustrates a descent flight pattern 300 for increasing perception of a ground-based obstacle (e.g., utility lines 122) by a machine vision system of UAV 105, in accordance with an embodiment of the disclosure. As illustrated, when descending from a cruise altitude towards a delivery location 115, UAV 105 can navigate a descent flight pattern 300, which incorporates aerial maneuvers that increase the perception (e.g., detection, tracking, and depth estimating) of utility lines 122 by a machine vision system, such as one that incorporates optical flow depth estimates. In the illustrated embodiment, descent flight pattern 300 includes a spiral descent. The spiral descent may have UAV 105 fly a downward spiral with a constantly changing heading or a constant heading (e.g., see FIG. 3D). Regardless of the UAV heading while navigating descent flight pattern 300, UAV 105 is translating about one or both of the lateral axes X and Y while descending towards its delivery location 115 along the vertical Z axis. For effective detection and tracking including optical flow depth estimates, lateral camera motion is desired while rotational motion (yaw, pitch, roll) is either tracked and algorithmically offset (discussed in greater detail below) or eliminated by the selected descent flight pattern 300.

Motions that are substantially perpendicular to the long axis of the obstacle (e.g., axis 305 of utility lines 122) are particularly desirable for detecting and tracking using optical flow. Due to the aperture problem, motions along the long axis 305 may be less informative than motion perpendicular to the long axis (i.e., motion along 310). If insufficient knowledge is known about the obstacle, then vacillating motions in both translational directions X and Y should be executed to increase perception regardless of the actual orientation and aspect ratio of the obstacle.

Figure 3B:
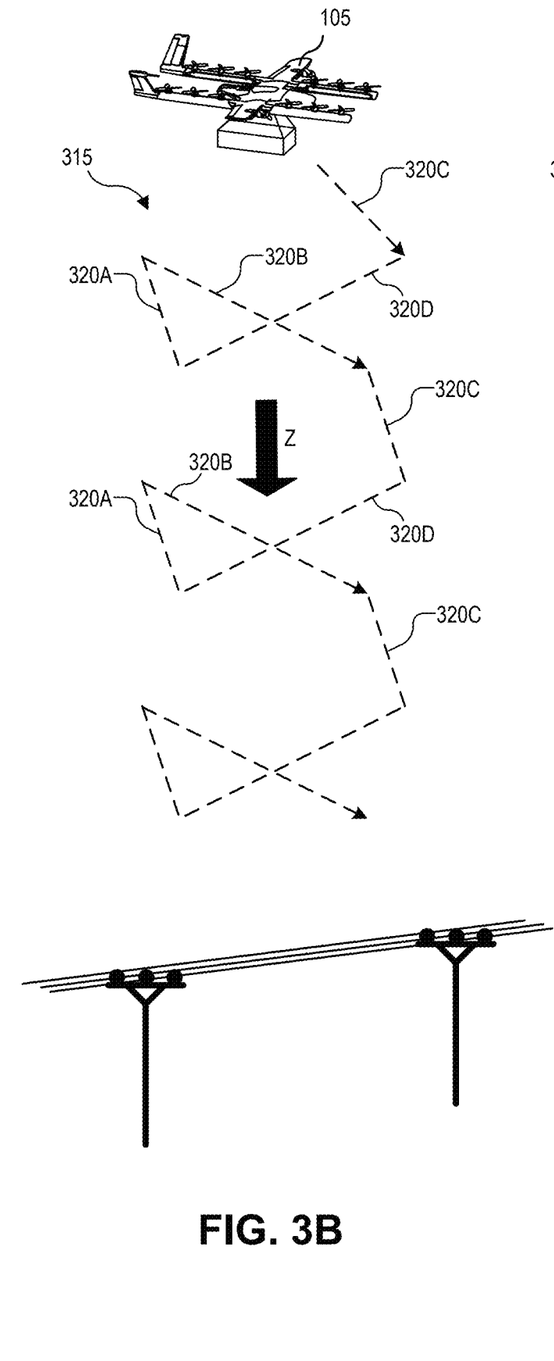
FIG. 3B illustrates a descent flight pattern including a rectangular spiral descent for increasing perception of a ground-based obstacle by a machine vision system, in accordance with an embodiment of the disclosure.

FIG. 3B illustrates a descent flight pattern 315 that includes an aerial maneuver having a rectangular spiral descent with linear flight path segments 320A-D, in accordance with an embodiment of the disclosure. Executing linear flight path segments 320 while navigating descent flight pattern 315 serves to reduce sources of angular velocity, which introduce rotational components in the flow velocities of the optical flow depth estimates. These rotational components can introduce additional error, since the angular velocity of UAV 105 must be measured and the resulting rotational components offset. Accordingly, descent flight pattern 315 is less susceptible to tracking errors and therefore potentially provides more accurate tracking and depth estimates of ground-based obstacles. However, the tradeoff with descent flight pattern 315 compared to a smooth circular or elliptical descent flight pattern is that it may be more energy/time intensive to execute the abrupt course changes between the sequential linear flight path segments 320.

FIG. 3B illustrates each linear flight path segment 320 as a vertically sloped line; however, in other embodiments, descent flight pattern 315 may include a vertical stack of rectangular segment groups with each rectangular segment group tracing a rectangle at a common altitude. In this alternative embodiment, UAV 105 would trace out a rectangle, before descending a fixed distance and tracing out another rectangle flight path.

Figure 3C:
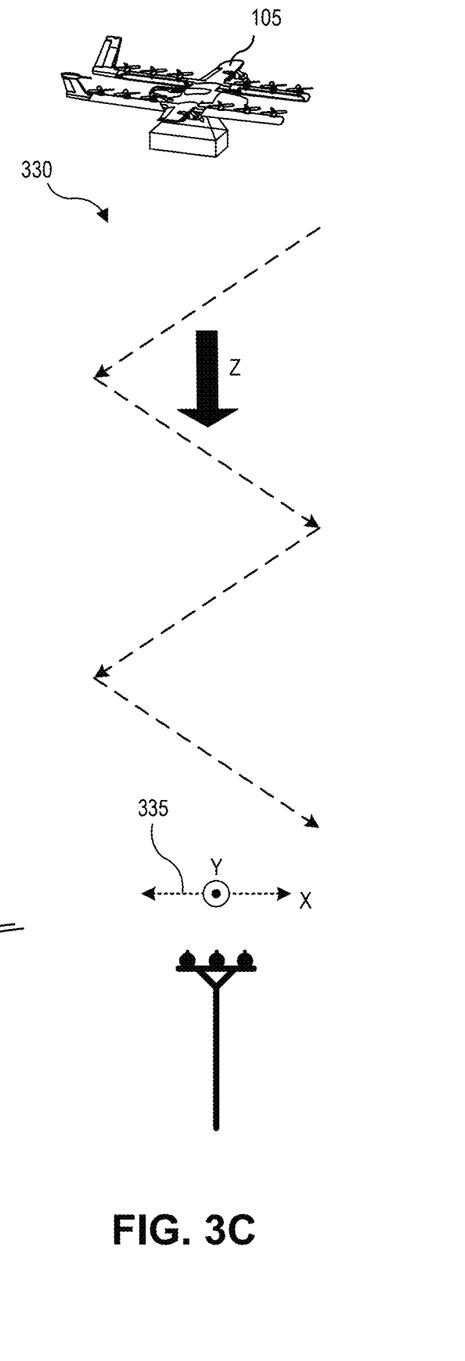
FIG. 3C illustrates a descent flight pattern including vacillation along a linear axis for increasing perception of a ground-based obstacle by a machine vision system, in accordance with an embodiment of the disclosure.

FIG. 3C illustrates another descent flight pattern 330, which includes vacillation along a linear axis 335 while descending in the vertical direction, in accordance with another embodiment of the disclosure. In scenarios where enough information is known to have a threshold level of confidence in the orientation of the long axis of the obstacle, descent flight pattern 330 may be navigated by orienting the axis of vacillation 335 to be substantially perpendicular to the long axis (Y axis in FIG. 3C is the long axis). Descent flight pattern 330 does not waste battery resources on traversing a dimension that provides sub-optimal tracking and depth estimates. Information about the obstacle and its orientation may be acquired from initial aerial imagery and/or semantic analysis of the surrounding environment. Semantic analysis may draw on upon image segmentation (object detection) of both the obstacle itself and the surrounding geography (e.g., orientation of streets), map data, GPS data, and other data from a knowledge graph accessible to UAV 105 to aid in the selection and/or initiation of a descent flight pattern.

Figure 3D:
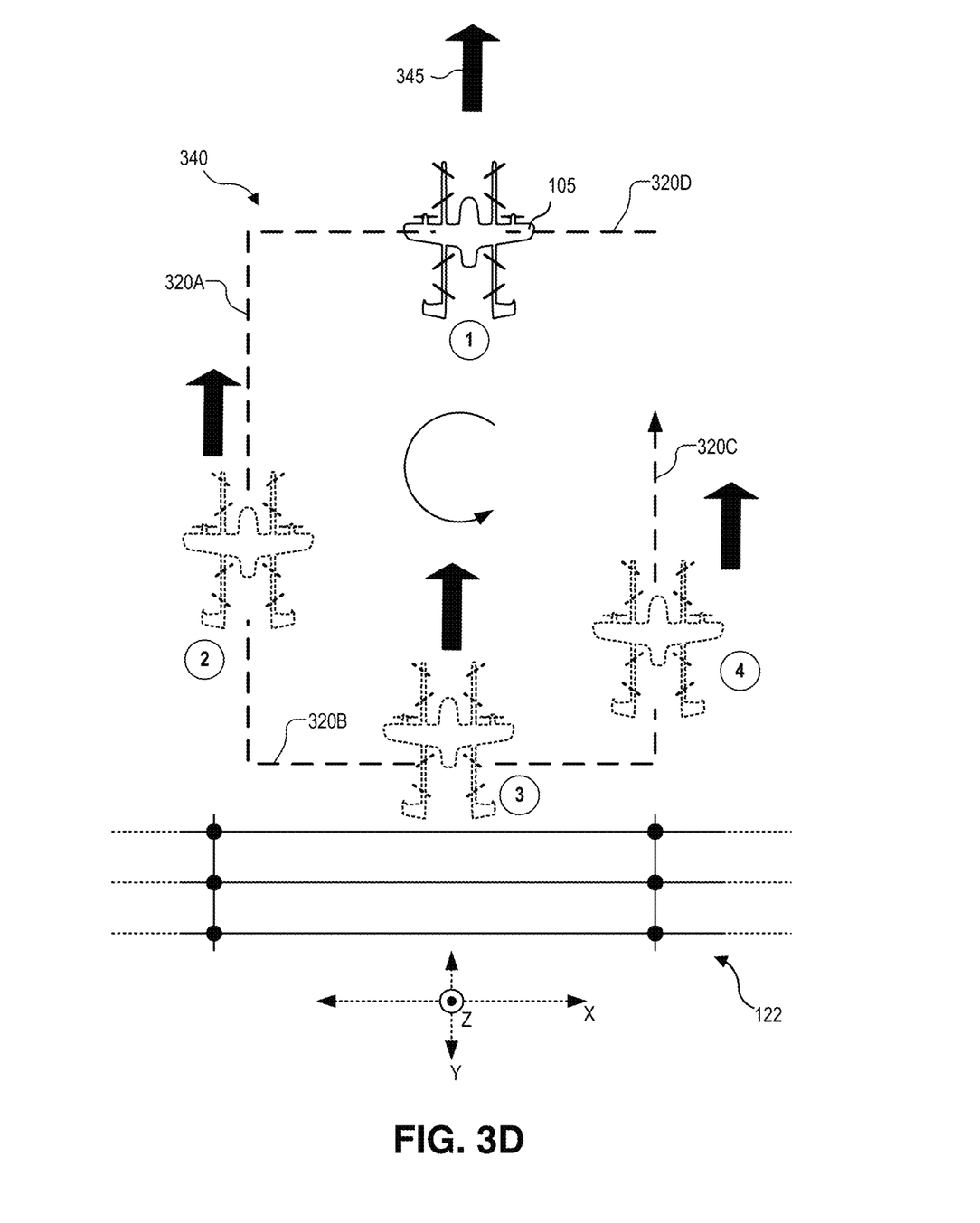
FIG. 3D illustrates a descent flight pattern including a rectangular spiral descent while maintaining a constant heading for increasing perception of a ground-based obstacle by a machine vision system, in accordance with an embodiment of the disclosure.

Finally, FIG. 3D is a plan view illustrating yet another descent flight pattern 340 including a rectangular spiral descent, similar to that illustrated in FIG. 3B, but maintains a constant heading 345 for UAV 105. Maintaining a constant heading 345 (e.g., constant north) while navigating descent flight pattern 340 eliminates yet another source of potential error from miss estimating rotational components due to yaw. While descent flight pattern 340 introduces more flight constraints, and may not be available on windy days as it doesn't permit UAV 105 to weathervane (orient into the wind), maintaining a constant heading can reduce a source of error when tracking and estimating the distance to an obstacle, such as utility lines 122. Additionally, descent flight pattern 340 can optionally orient longer linear flight path segments 320A and 320C along an axis that is deemed to be more perpendicular to the long axis of the obstacle while orienting shorter linear flight path segments 320B and 320D to be more parallel to the long axis of the obstacle.

Figure 4:
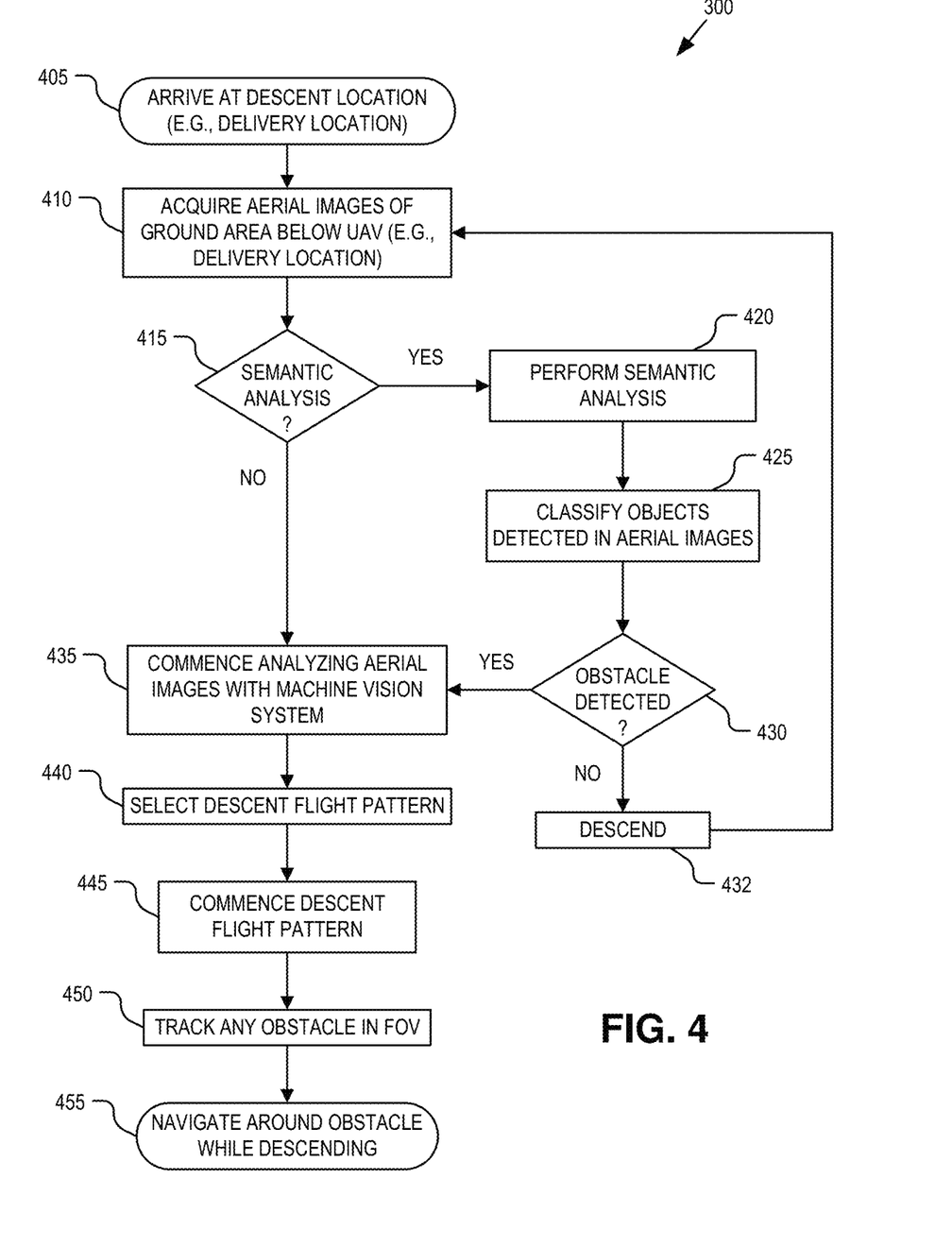
FIG. 4 is a flow chart illustrating a process of using a descent flight pattern to enhance detection of ground-based obstacles via machine vision, in accordance with an embodiment of the disclosure.

FIG. 4 is a flow chart illustrating a process 400 of using a descent flight pattern to enhance detection of ground-based obstacles via machine vision, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, UAV 105 arrives at a descent location over a ground area. The descent location may represent a location at which the UAV 105 intends to descend from a first higher altitude (e.g., cruise altitude) to a second lower altitude (e.g., 2 or 3 m off the ground) or even a landing location. In the example of a package delivery service, the ground area may be a delivery or package drop-off location residing below the descent location. In a process block 410, UAV 105 acquires aerial images of the ground area below the UAV. In one embodiment, the aerial images are acquired as a continuous video stream from an onboard camera system of UAV 105. The aerial images may include one or more of sequential frame images, stereoscopic images, lidar images, event camera images, infrared images, black and white images, monochrome images, full color images, or otherwise.

In some embodiments, UAV 105 includes an onboard control system that executes a semantic analysis of the descent location based upon a variety of data inputs (decision block 415). In these situations, a semantic model, such as a trained neural network, can analyze (process block 420) the aerial images along with other data to classify any object identified within the aerial images into an obstacle classification or non-obstacle classification (process block 425). Objects classified into the obstacle class are objects deemed to present a potential collision hazard. Other data that may be referenced when classifying objects in the aerial images includes map data, a three-dimensional (3D) model of the ground area, or other data gleaned from a knowledge graph of the area. Any objects in the aerial images that are classified into the obstacle class (decision block 430), should be closely tracked and offset distances precisely estimated to ensure UAV 105 maintains a safe distance when descending. Classification of one or more objects into the obstacle class, or classifications with a low level of confidence will trigger execution of descent flight pattern to enhance detection and tracking. If semantic analysis determines that the ground area is free of obstacles with a sufficiently high level of confidence (decision block 430), then UAV 105 may perform a conventional straight descent (process block 432) without performing one of the descent flight patterns described above in connection with FIGS. 3A-D.

Of course, in other embodiments, semantic analysis of the land area may be omitted in favor of automatically performing a descent flight pattern every time UAV 105 descends, every time UAV 105 descends at a location of first impression, or every time UAV 105 descends at a location deemed to meet a threshold risk profile. As such, in some embodiments, semantic analysis and process blocks 420-430 may be bypassed at decision block 415.

In a process block 435, UAV 105 begins (or continues if semantic analysis was performed in process block 420) analyzing the aerial images with a machine vision system to detect the presence of an obstacle. Detecting the presence of an obstacle can include an initial detection and subsequent tracking along with offset distance estimation of the obstacle captured in the aerial images. In one embodiment, the machine vision system comprises an optical flow image analysis that compares sequential aerial images to calculate flow velocities of image pixels. The optical flow analysis may be performed on regular fame images, on event camera images, on infrared images, or otherwise. With commencement of the machine vision analysis, a descent flight pattern may be selected (process block 440). The descent flight patterns are selected to increase perception of ground-based obstacles. The selected descent flight pattern may be any of the descent flight patterns discussed above in connection with FIGS. 3A-D. In one embodiment, the descent flight pattern is preselected at the time of mission planning before UAV 105 embarks on its flight. In other embodiments, the specific descent flight pattern may be selected in real-time based upon the initial aerial images, the semantic analysis, weather conditions (e.g., high wind or low wind conditions), or otherwise. The descent flight pattern may even be revised midway through the descent flight pattern to increase perception of the obstacle. For example, as soon as a long axis of an object/obstacle in the aerial images is identified, then the descent flight pattern may be refined to orientate lateral motions (e.g., linear vacillations) perpendicular to the long axis of the obstacle.

With the descent flight pattern selected, UAV 105 commences its descent towards the ground (e.g., delivery location) in a process block 445. While navigating the descent flight pattern, UAV 105 continues to acquire the aerial images and analyze those images with its machine vision system to detect and track (including estimating offset distances) any obstacles present within its field of view (process block 450). The aerial maneuvers executed while navigating the descent flight pattern serve to enhance or otherwise increase perception of those obstacles by ensuring appropriate lateral movement along the X and Y dimensions are included in that descent. A direct vertical Z axis descent towards the ground without appropriate lateral motions as discussed above may obscure certain types of obstacles like utility lines. In contrast, the descent flight patterns discussed above can accentuate obstacles like utility lines 122. Once one or more obstacles have been initially detected by the machine vision system, those obstacle(s) are tracked in process block 450. The descent flight pattern helps increase the perception of those obstacles, thereby improving tracking. In some embodiments, the descent flight pattern can be revised or changed mid-descent as obstacles are visualized and more information is gathered throughout the descent. The obstacle tracking, including offset depth estimates, can then be used to navigate UAV 105 around the obstacle and maintain safe operating distances (process block 455).

Figure 5A:
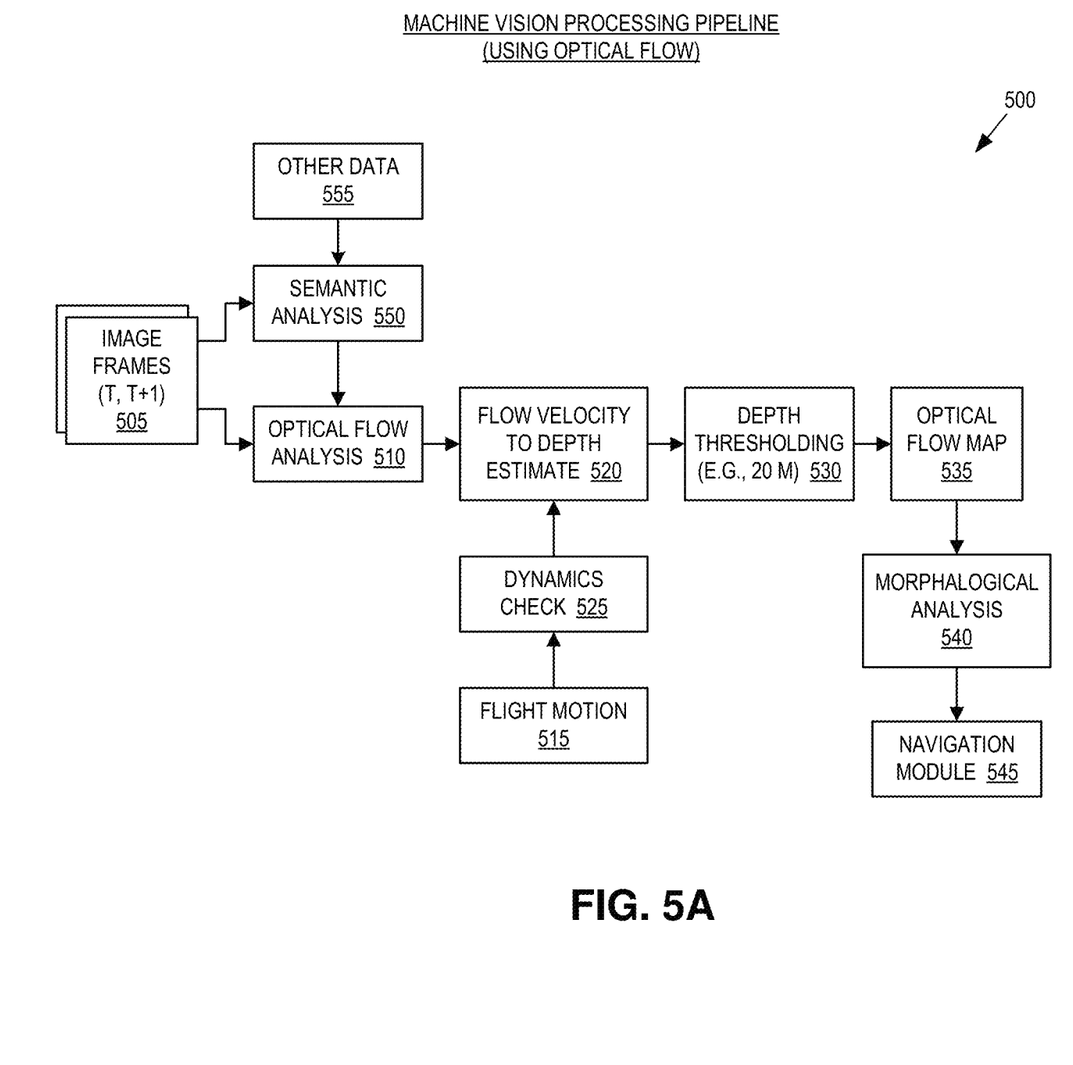
FIG. 5A is a block diagram illustrating a machine vision processing pipeline using optical flow for detection of ground-based obstacles, in accordance with an embodiment of the disclosure.

FIG. 5A is a dataflow block diagram illustrating a machine vision processing pipeline 500 using optical flow image processing for the detection, tracking, and depth estimating of ground-based obstacles, in accordance with an embodiment of the disclosure. At block 505 consecutive aerial image frames of a video stream (e.g., a monovision sub-stream from a stereovision camera system) are acquired by the onboard camera system of UAV 105 and analyzed at block 510 using optical flow image analysis techniques. These optical flow image analysis techniques may include conventional optical flow analysis (e.g., sparse optical flow), machine learning optical flow analysis (e.g., dense optical flow where every or nearly every image pixel is analyzed), a combination thereof, or otherwise to determine the flow velocities of image pixels moving between consecutive image frames at times T and T+1. For example, the flow velocities may include counts of the number of pixels a given image pixel moves between consecutive frames along with a direction (e.g., pixel direction vector).

Flow velocities of image pixels may occur due to both translational movement of UAV 105 and rotational movement of UAV 105. The flow velocity component due to translational camera movement includes depth information, while the flow velocity components due to rotational motion do not and thus should be eliminated or offset. Equations 1 and 2 below detail the x and y flow velocity components:

$$v_x = \frac{T_z x - T_x f}{Z} - \left[\omega_y f + \omega_z y + \frac{\omega_x xy}{f} - \frac{\omega_y x^2}{f}\right], \quad (Eq.\ 1)$$

$$v_y = \frac{T_z y - T_y f}{Z} + \left[\omega_x f - \omega_z x - \frac{\omega_y xy}{f} + \frac{\omega_x y^2}{f}\right], \quad (Eq.\ 2)$$

where $v_x$ and $v_y$ represent x and y components of a 3D flow velocity; $T_x$, $T_y$, and $T_z$ represent linear velocities; $\omega_x$, $\omega_y$, and $W_z$ represent angular velocities; f represents camera focal length; and Z represents depth (i.e., distance from camera). The first fractional expression over Z in each of Eqs. 1 and 2 represent the translational component of flow velocities while the remaining expressions in square brackets are rotational components that should be eliminated or offset. Accordingly, onboard motion sensors (e.g., GPS sensor, inertial measurement unit, gyroscope, etc.) are used to measure the translational and angular motion of UAV 105 while the video stream is acquired. This flight motion is obtained at block 515 and used to compute depth estimates from the flow velocities at block 520 using Eqs. 1 and 2 by solving for Z. In one embodiment, a dynamics check (block 525) is performed to determine when UAV 105 is flying along a straight path without yaw, roll, or pitch motions. During these straight path flight segments, flow-based processing to compute flow depth estimates is simplified since the rotational components are known to be negligible. Alternatively, the flight motion may be measured and used to offset or compensate for the deleterious rotational components and solve Eqs. 1 and 2 for Z.

Figure 5B:
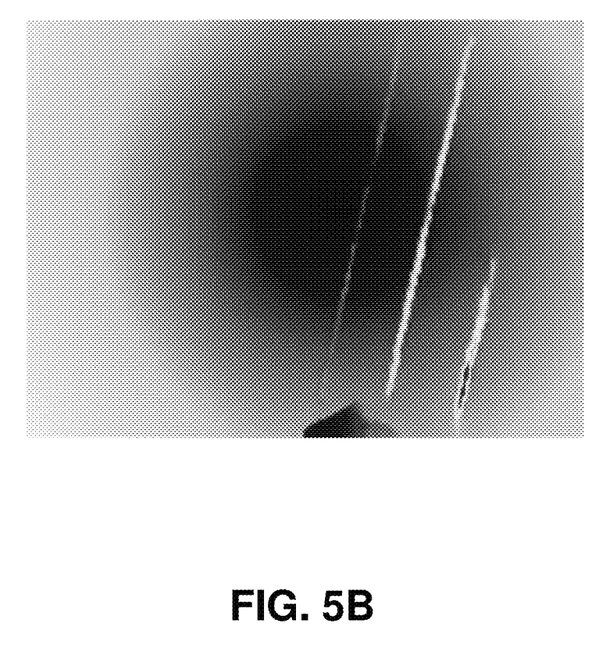
FIG. 5B illustrates an example optical flow map tracking utility lines, in accordance with an embodiment of the disclosure.

With the flow-based depth estimates determined, these depth estimates may be depth thresholded (e.g., 20 m threshold) at block 530 to generate optical flow map 535, which includes all image pixels estimated to fall within the threshold depth. FIG. 5B illustrates an example optical flow map of utility lines 122. The optical flow map represents a sort of heat map of the scene below UAV 105 with closer objects represented in "hotter" colors. Optical flow map 535 is then morphologically analyzed at block 540. Morphological analysis may include image filters to eliminate noise and other anomalies that don't move, or change over time in a manner inconsistent with ground-based scenery. The morphological analysis may also include image segmentation (i.e., object detection) to identify and track contiguous pixel groups or pixel blobs representing discrete objects in the image frames. The pixel blobs may be size and/or shape thresholded to further eliminate anomalies or inconsequential pixel groups. Size thresholding may include minimum contiguous pixel counts, minimum area calculations, specific shapes, or otherwise. The pixel blobs may also be temporally thresholded. Accordingly, flow-based conditions indicative of an obstacle encounter may include: (1) the persistence of pixel blobs having (2) a minimum threshold size falling within (3) a threshold depth for (4) a threshold period of time, and optionally (5) having a characteristic shape.

The object tracking and depth estimates output from the optical flow processing pipeline may be fed into the avionics or navigation module (process block 545) of UAV 105 to provide active avoidance of obstacles.

As mentioned above, semantic analysis (block 550) may also be used to determine when to activate optical flow analysis, when to execute a descent flight pattern versus a conventional straight descent, or even which specific descent flight pattern to select. Semantic analysis 550 can draw information and other data 555 about the surrounding environment and the ground area below UAV 105 from a variety of sources. For example, this other data 555 may include map data, other satellite images, lidar images, event camera images, land use data, department of transportation data, municipal data, existing 3D models of the area, etc. Of course, semantic analysis 550 may also apply image segmentation and object recognition on image frames 505 themselves as well. In other words, other data 555 may be pulled from a broad-based knowledge graph, including aerial images, accessible to UAV 105. Semantic analysis 550 may be a heuristic algorithm or a neural network trained on large datasets of past UAV missions to identify objects that pose a hazardous collision threat. In one embodiment, semantic analysis 550 applies a threat analysis on the objects perceived in the aerial images and applies a confidence interval. If the assigned confidence interval is low or the perceived threat is deemed to be high, then semantic analysis 500 may trigger the onboard machine vision system to perform selected descent flight paths and use optical flow analysis to enhance perception of an obstacle deemed to be a potential hazard.

Figure 6A:
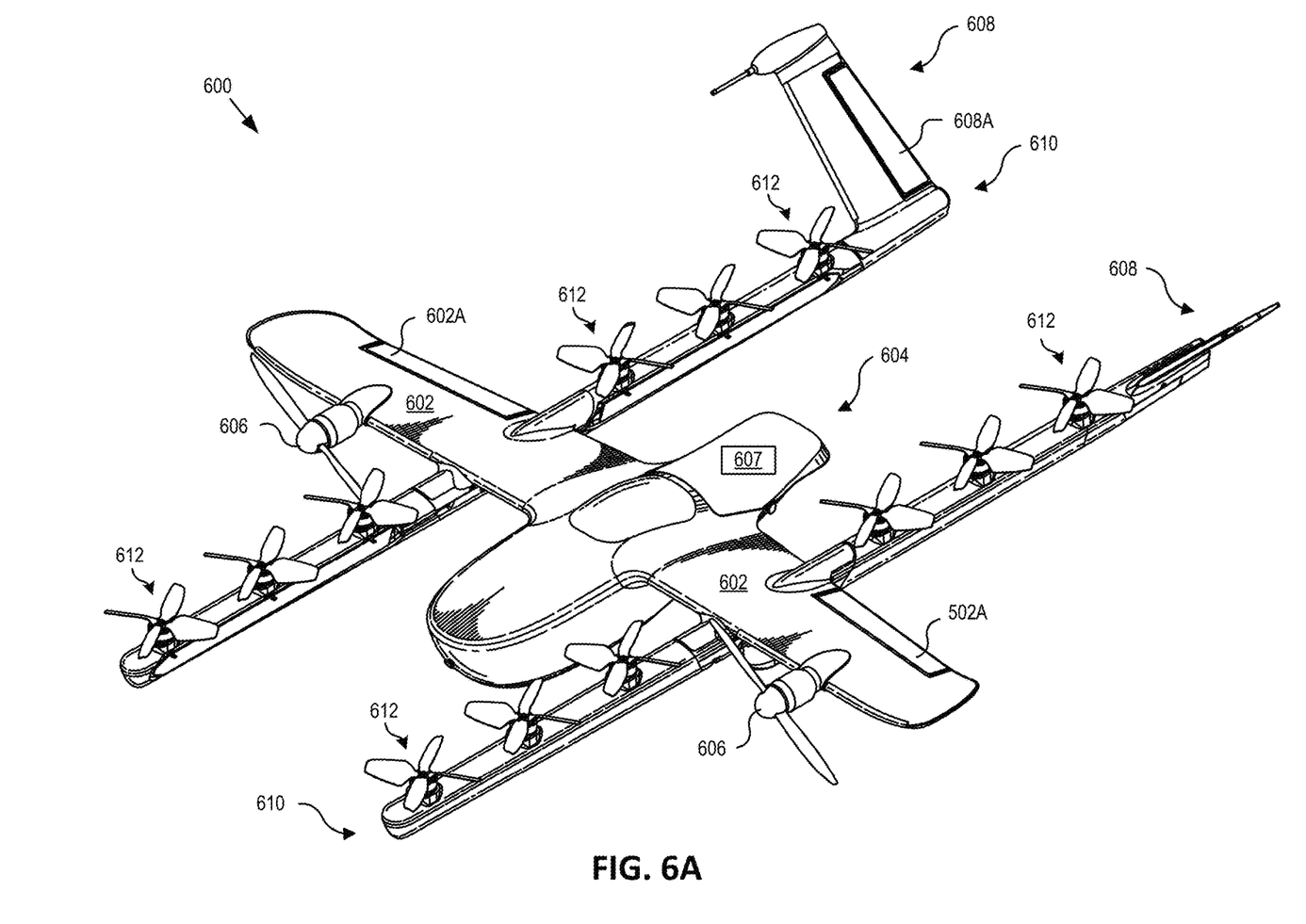
FIG. 6A is a perspective view illustration of a UAV configured for identifying obstacles using machine vision techniques, in accordance with an embodiment of the disclosure.
Figure 6B:
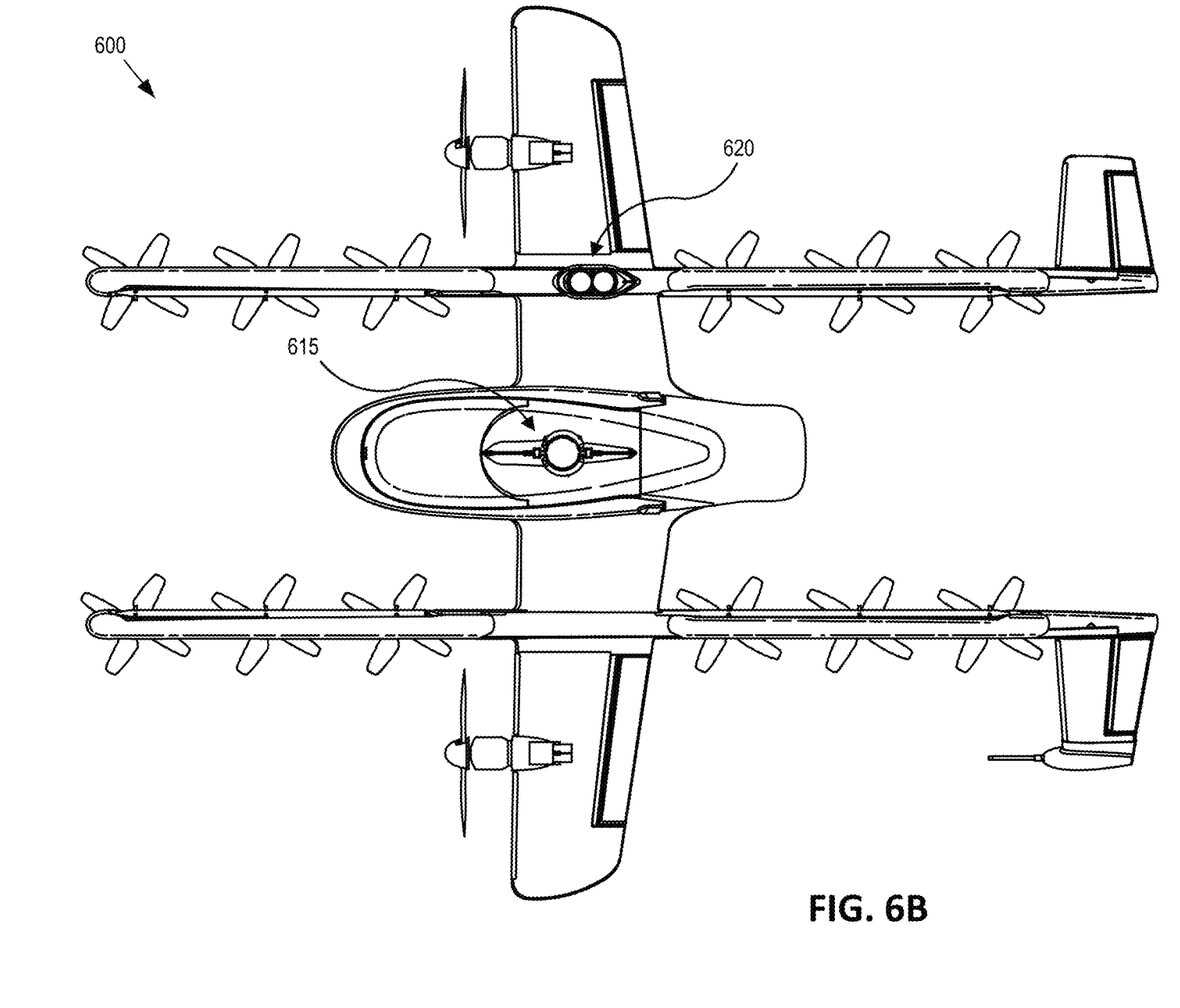
FIG. 6B is an underside plan view illustration of the UAV configured for identifying obstacles using machine vision techniques, in accordance with an embodiment of the disclosure.

FIGS. 6A and 6B illustrate an example UAV 600 that is well suited for delivery of packages, in accordance with an embodiment of the disclosure. FIG. 6A is a topside perspective view illustration of UAV 600 while FIG. 6B is a bottom side plan view illustration of the same. UAV 600 is one possible implementation of UAVs 105 illustrated in FIG. 1, although other types of UAVs may be implemented as well.

The illustrated embodiment of UAV 600 is a vertical takeoff and landing (VTOL) UAV that includes separate propulsion units 606 and 612 for providing horizontal and vertical propulsion, respectively. UAV 600 is a fixed-wing aerial vehicle, which as the name implies, has a wing assembly 602 that can generate lift based on the wing shape and the vehicle's forward airspeed when propelled horizontally by propulsion units 606. The illustrated embodiment of UAV 600 has an airframe that includes a fuselage 604 and wing assembly 602. In one embodiment, fuselage 604 is modular and includes a battery module, an avionics module, and a mission payload module. These modules are secured together to form the fuselage or main body.

The battery module (e.g., fore portion of fuselage 604) includes a cavity for housing one or more batteries for powering UAV 600. The avionics module (e.g., aft portion of fuselage 604) houses flight control circuitry of UAV 600, which may include a processor and memory, communication electronics and antennas (e.g., cellular transceiver, wifi transceiver, etc.), and various sensors (e.g., global positioning sensor, an inertial measurement unit, a magnetic compass, a radio frequency identifier reader, etc.). Collectively, these functional electronic subsystems for controlling UAV 600, communicating, and sensing the environment may be referred to as an onboard control system 607. The mission payload module (e.g., middle portion of fuselage 604) houses equipment associated with a mission of UAV 600. For example, the mission payload module may include a payload actuator 615 (see FIG. 6B) for holding and releasing an externally attached payload (e.g., package for delivery). In some embodiments, the mission payload module may include camera/sensor equipment (e.g., camera, lenses, radar, lidar, pollution monitoring sensors, weather monitoring sensors, scanners, etc.). In FIG. 6B, an onboard camera system 620 is mounted to the underside of UAV 600 to support a machine vision system (e.g., monovision frame camera, stereoscopic machine vision, event camera, lidar depth camera, etc.) for visual triangulation and navigation as well as operate as an optical code scanner for reading visual codes affixed to packages. These visual codes may be associated with or otherwise match to delivery missions and provide the UAV with a handle for accessing destination, delivery, and package validation information.

As illustrated, UAV 600 includes horizontal propulsion units 606 positioned on wing assembly 602 for propelling UAV 600 horizontally. UAV 600 further includes two boom assemblies 610 that secure to wing assembly 602. Vertical propulsion units 612 are mounted to boom assemblies 610. Vertical propulsion units 612 providing vertical propulsion. Vertical propulsion units 612 may be used during a hover mode where UAV 600 is descending (e.g., to a delivery location), ascending (e.g., at initial launch or following a delivery), or maintaining a constant altitude. Stabilizers 608 (or tails) may be included with UAV 600 to control pitch and stabilize the aerial vehicle's yaw (left or right turns) during cruise. In some embodiments, during cruise mode vertical propulsion units 612 are disabled or powered low and during hover mode horizontal propulsion units 606 are disabled or powered low.

During flight, UAV 600 may control the direction and/or speed of its movement by controlling its pitch, roll, yaw, and/or altitude. Thrust from horizontal propulsion units 606 is used to control air speed. For example, the stabilizers 608 may include one or more rudders 608A for controlling the aerial vehicle's yaw, and wing assembly 602 may include elevators for controlling the aerial vehicle's pitch and/or ailerons 602A for controlling the aerial vehicle's roll. While the techniques described herein are particularly well-suited for VTOLs providing an aerial delivery service, it should be appreciated that analyzing shadow lengths to infer the heights of ground-based obstacles is applicable to a variety of aircraft types (not limited to VTOLs) providing a variety of services or serving a variety of functions beyond package deliveries.

Many variations on the illustrated fixed-wing aerial vehicle are possible. For instance, aerial vehicles with more wings (e.g., an "x-wing" configuration with four wings), are also possible. Although FIGS. 6A and 6B illustrate one wing assembly 602, two boom assemblies 610, two horizontal propulsion units 606, and six vertical propulsion units 612 per boom assembly 610, it should be appreciated that other variants of UAV 600 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention,
including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for detection of an obstacle by an unmanned aerial vehicle (UAV) providing an aerial delivery service, the method comprising:
   arriving above a delivery location at a first altitude by the UAV;
   initiating a descent flight pattern for the UAV that facilitates detection or tracking of the obstacle by a machine vision system disposed onboard the UAV, wherein the descent flight pattern comprises a rectangular spiral descent having linear flight path segments that sequentially descend;
   navigating the descent flight pattern from the first altitude towards the delivery location;
   acquiring aerial images of the delivery location below the UAV with a camera system disposed onboard the UAV, wherein at least some of the aerial images are acquired while the UAV navigates the descent flight pattern; and
   analyzing the aerial images with the machine vision system disposed onboard the UAV to detect or track the obstacle in the aerial images.

2. The method of claim 1, wherein analyzing the aerial images with the machine vision system comprises:
   analyzing the aerial images with an optical flow algorithm, wherein the descent flight pattern includes aerial maneuvers by the UAV selected to increase perception of the obstacle by the optical flow algorithm.

3. The method of claim 2, further comprising:
   measuring an angular velocity of the UAV with a motion sensor disposed onboard the UAV while capturing the aerial images,
   wherein analyzing the aerial images with the optical flow algorithm includes:
      determining flow velocities of image pixels in the aerial images; and
      offsetting rotational components in the flow velocities based upon the angular velocity measured by the motion sensor while capturing the aerial images.

4. The method of claim 1, wherein the descent flight pattern maintains a constant heading for the UAV while the UAV tracks the spiral descent.

5. The method of claim 1, wherein the obstacle comprises an object having an aerial perspective shape with a long axis and a short axis, wherein the descent flight pattern is oriented to vacillate along a linear axis that is deemed to be perpendicular to the long axis while the UAV descends towards the delivery location.

6. The method of claim 1, further comprising:
   analyzing the aerial images with a semantic model of the machine vision system that classifies objects detected in the aerial images into an obstacle class or non-obstacle class; and
   initiating the descent flight pattern in response to one of the objects in the aerial images being classified into the obstacle class.

7. The method of claim 1, where the obstacle comprises above ground powerlines or above ground telecommunication lines.

8. The method of claim 1, wherein the camera system comprises one or more of a frame camera, a stereovision camera, an event camera, or a lidar depth camera.

9. The method of claim 1, wherein the descent flight pattern is selected to improve estimation of an offset distance between the UAV and the object.

10. The method of claim 1, wherein selecting the descent flight pattern for the UAV comprises selecting the descent flight pattern to improve tracking of the obstacle by the machine vision system disposed onboard the UAV while the UAV descends towards the delivery location.

11. At least one non-transitory machine-readable storage medium storing instructions that, when executed by a processing system of an unmanned aerial vehicle (UAV) will cause the UAV to perform operations comprising:
   arriving above a location at a first altitude;
   navigating a descent flight pattern from the first altitude towards the location;
   capturing aerial images of the location below the UAV with a camera system disposed onboard the UAV, wherein at least some of the aerial images are captured while the UAV navigates the descent flight pattern;

analyzing the aerial images with an optical flow algorithm of a machine vision system to detect or track an obstacle in the aerial images; and measuring an angular velocity of the UAV with a motion sensor disposed onboard the UAV while capturing the aerial images, wherein analyzing the aerial images with the optical flow algorithm includes:

determining flow velocities of image pixels in the aerial images; and offsetting rotational components in the flow velocities based upon the angular velocity measured by the motion sensor while capturing the aerial images.

12. The at least one non-transitory machine-readable storage medium of claim 11, wherein the descent flight pattern includes aerial maneuvers by the UAV selected to increase perception of the obstacle by the optical flow algorithm.

13. The at least one non-transitory machine-readable storage medium of claim 11, wherein the descent flight pattern comprises a spiral descent.

14. The at least one non-transitory machine-readable storage medium of claim 13, wherein the descent flight pattern maintains a constant heading for the UAV while the UAV tracks the spiral descent.

15. The at least one non-transitory machine-readable storage medium of claim 13, wherein the spiral descent comprises a rectangular spiral descent having linear flight path segments that sequentially descend.

16. The at least one non-transitory machine-readable storage medium of claim 11, wherein the obstacle comprises an object having an aerial perspective shape with a long axis and a short axis, wherein the descent flight pattern is oriented to vacillate along a linear axis that is deemed to be perpendicular to the long axis while the UAV descends towards the location.

17. The at least one non-transitory machine-readable storage medium of claim 11, wherein the operations further comprise:

analyzing the aerial images with a semantic model of the machine vision system that classifies objects detected in the aerial images into an obstacle class or non-obstacle class; and initiating the descent flight pattern in response to one of the objects in the aerial images being classified into the obstacle class.

18. The at least one non-transitory machine-readable storage medium of claim 11, where the obstacle comprises above ground powerlines or above ground telecommunication lines.

19. The at least one non-transitory machine-readable storage medium of claim 11, wherein the camera system comprises one or more of a frame camera, a stereovision camera, an event camera, or a lidar depth camera.

20. At least one non-transitory machine-readable storage medium storing instructions that, when executed by a processing system of an unmanned aerial vehicle (UAV) will cause the UAV to perform operations comprising:

arriving above a location at a first altitude;

navigating a descent flight pattern from the first altitude towards the location;

acquiring aerial images of the location below the UAV with a camera system disposed onboard the UAV, wherein at least some of the aerial images are acquired while the UAV navigates the descent flight pattern; and analyzing the aerial images with a machine vision system that is adapted to detect a presence of an obstacle in the aerial images, wherein the obstacle comprises an object having an aerial perspective shape with a long axis and a short axis, wherein the descent flight pattern is oriented to vacillate along a linear axis that is deemed to be perpendicular to the long axis while the UAV descends towards the location.

21. At least one non-transitory machine-readable storage medium storing instructions that, when executed by a processing system of an unmanned aerial vehicle (UAV) will cause the UAV to perform operations comprising:

arriving above a location at a first altitude;

navigating a descent flight pattern from the first altitude towards the location;

acquiring aerial images of the location below the UAV with a camera system disposed onboard the UAV, wherein at least some of the aerial images are acquired while the UAV navigates the descent flight pattern; and analyzing the aerial images with a machine vision system that is adapted to detect a presence of an obstacle in the aerial images, wherein the descent flight pattern comprises a spiral descent and maintains a constant heading for the UAV while the UAV navigates the spiral descent.

* * * * *